(12) United States Patent
Nakamura

(10) Patent No.: US 8,891,092 B2  
(45) Date of Patent: Nov. 18, 2014

(54) IMAGE FORMING APPARATUS AND IMAGE FORMING METHOD

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/306,457

(22) Filed: Nov. 29, 2011

(65) Prior Publication Data

US 2012/0147403 A1 Jun. 14, 2012

(30) Foreign Application Priority Data

Dec. 9, 2010 (JP) ................................. 2010-274434

(51) Int. Cl.
- *G06K 15/02* (2006.01)
- *B41J 2/47* (2006.01)
- *G06K 15/12* (2006.01)

(52) U.S. Cl.
CPC ............. *B41J 2/471* (2013.01); *G06K 15/1219* (2013.01)
USPC .......................... 358/1.13; 358/1.15; 358/1.16

(58) Field of Classification Search
None
See application file for complete search history.

(56) References Cited

U.S. PATENT DOCUMENTS

2008/0123157 A1* 5/2008 Kinoshita ..................... 358/451

FOREIGN PATENT DOCUMENTS

| JP | 1-155486 A | 6/1989 |
|---|---|---|
| JP | 3-73666 A | 3/1991 |
| JP | 2004-098592 A | 4/2004 |
| JP | 2006-020181 A | 1/2006 |
| JP | 2009-126091 A | 6/2009 |

OTHER PUBLICATIONS

Office Action mailed Sep. 18, 2014, in Japanese Patent Appln. No. 2010-274434, Japanese Patent Office.

* cited by examiner

*Primary Examiner* — Mark Zimmerman  
*Assistant Examiner* — Darryl V Dottin  
(74) *Attorney, Agent, or Firm* — Fitzpatrick, Cella, Harper & Scinto

(57) ABSTRACT

If pixel segment insertion/extraction control by random number control which is uniform irrespective of a type of image data is performed, in the case of a character or diagram, main scanning positions where the pixel-segment insertion/extraction is executed become discontinuous in a sub-scanning direction, and image quality deteriorates. To solve the above problem, there is provided an image forming apparatus having: a unit for dividing an image into a plurality of areas in the main scanning direction; a unit for setting a reference area for performing pixel segment insertion/extraction control in each of divided areas; and a unit for deciding a position where the pixel segment insertion/extraction control in each of the divided area, in accordance with attribute information of image data in the set reference area.

10 Claims, 9 Drawing Sheets

| INPUT VALUE | OUTPUT VALUE |
|---|---|
| b'0000 | X'0000 |
| b'0001 | X'0001 |
| b'0010 | X'0003 |
| b'0011 | X'0007 |
| b'0100 | X'000F |
| b'0101 | X'001F |
| b'0110 | X'003F |
| b'0111 | X'007F |
| b'1000 | X'00FF |
| b'1001 | X'01FF |
| b'1010 | X'03FF |
| b'1011 | X'07FF |
| b'1100 | X'0FFF |
| b'1101 | X'1FFF |
| b'1110 | X'3FFF |
| b'1111 | X'FFFF |

FIG. 5
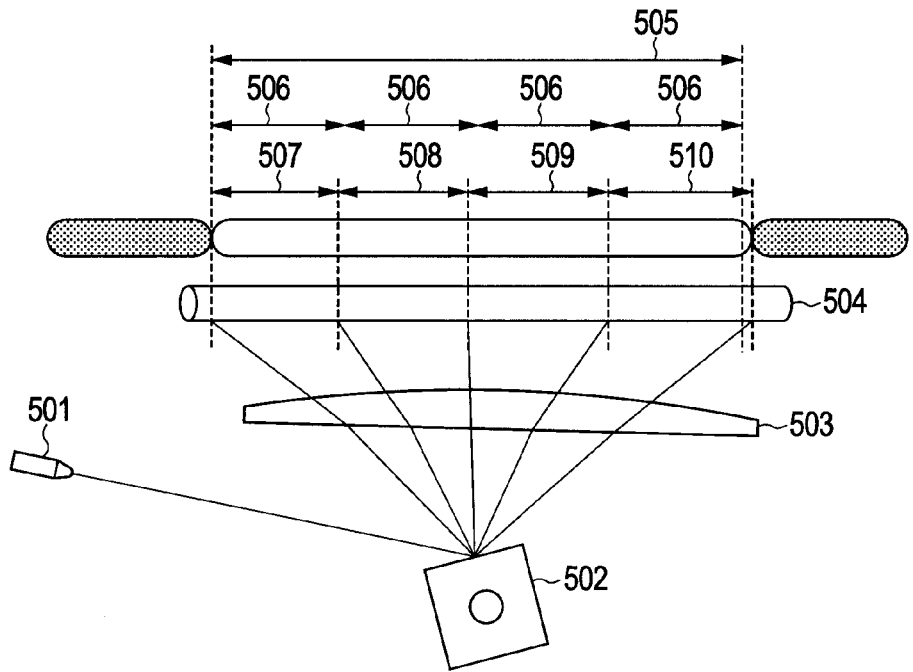
FIG. 6
| AREA | PRINT UNIT 1 | PRINT UNIT 2 | PRINT UNIT 3 |
|---|---|---|---|
| AREA 507 | 1.2% INSERTION | 1.4% INSERTION | 1.05% INSERTION |
| AREA 508 | 1.08% INSERTION | 1.1% INSERTION | 1.01% EXTRACTION |
| AREA 509 | 1.05% EXTRACTION | 1.08% EXTRACTION | 1.02% EXTRACTION |
| AREA 510 | 1.3% EXTRACTION | 1.35% EXTRACTION | 1.04% EXTRACTION |
FIG. 7
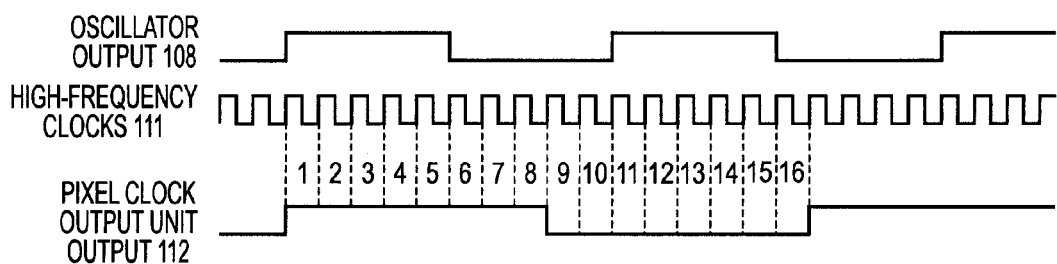

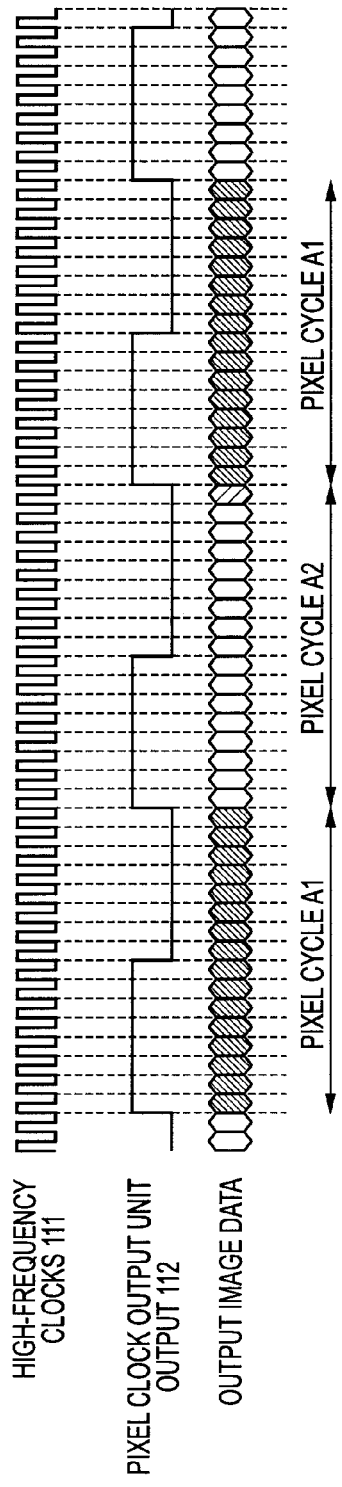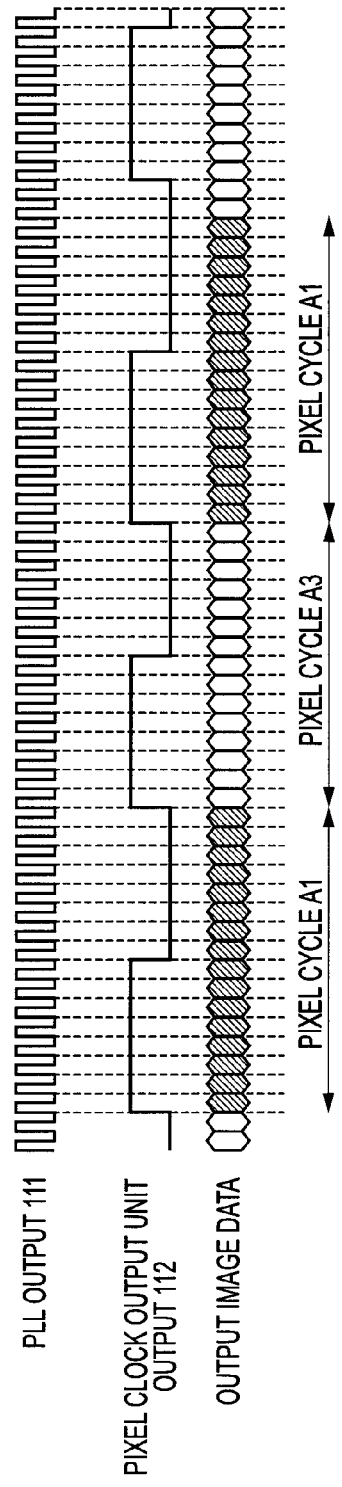

FIG. 9A
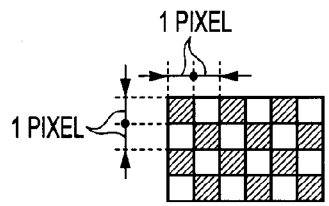
FIG. 9B
| INPUT | OUTPUT | WAVEFORM |
|---|---|---|
| 0 | 0x0000 | |
| 1 | 0xFFFF | |
FIG. 9C
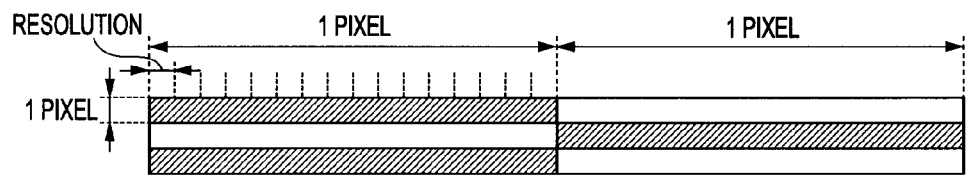
FIG. 9D
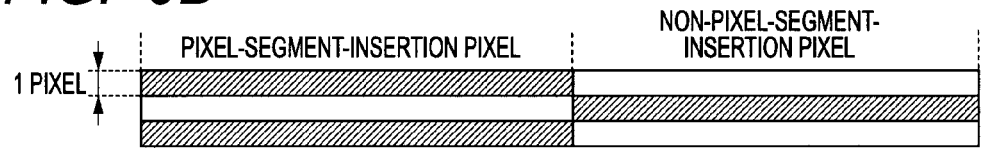
FIG. 9E
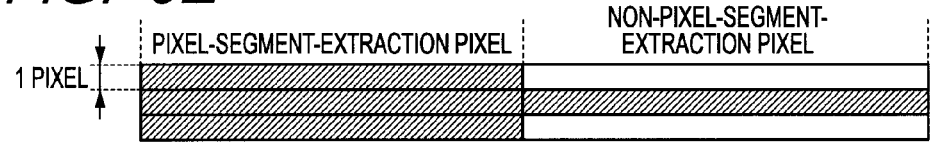
FIG. 9F
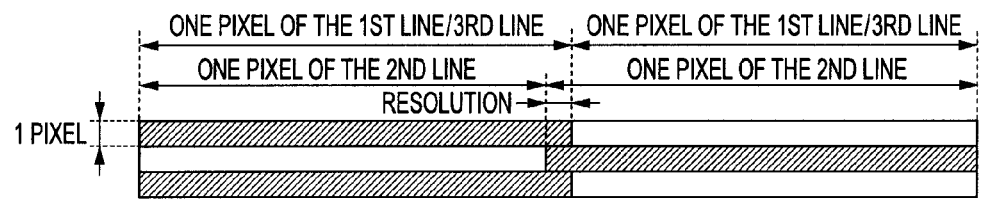
FIG. 9G
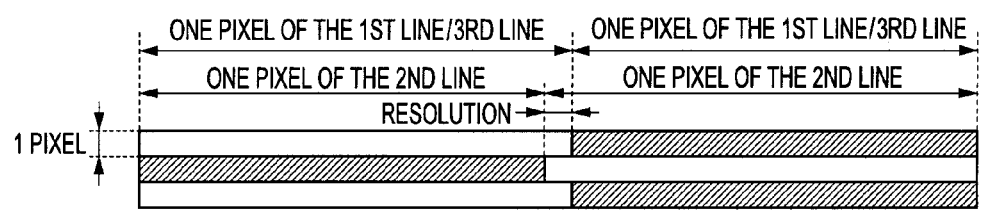

*FIG. 10A*  *FIG. 10B*
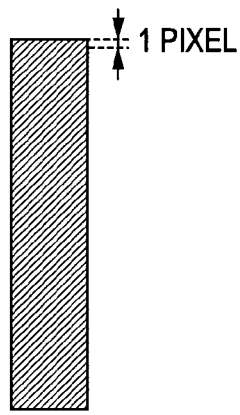
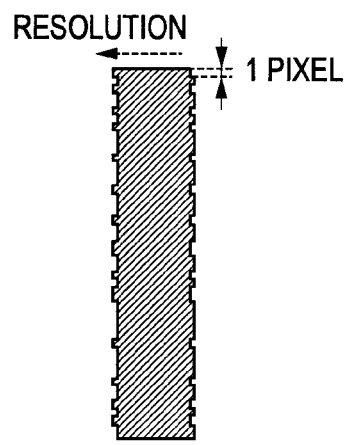
*FIG. 11A*  *FIG. 11B*  *FIG. 11C*
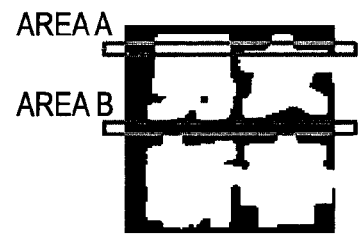
*FIG. 12*
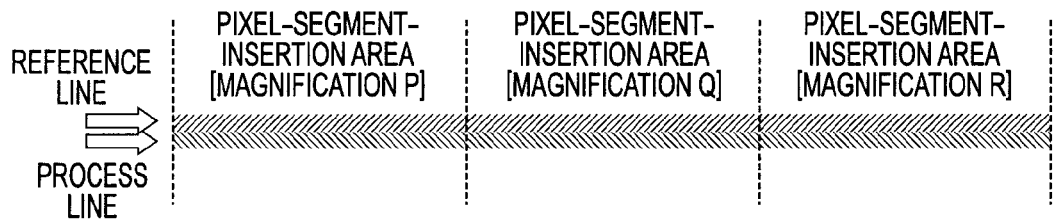

IMAGE FORMING APPARATUS AND IMAGE FORMING METHOD

BACKGROUND OF THE INVENTION

1. Field of the Invention

The present invention relates to an image forming apparatus of an electrophotographic system such as copying apparatus, printer, facsimile apparatus (FAX), or the like for performing an image exposure by a laser beam and, more particularly, to a correction of an improper scanning position.

2. Description of the Related Art

In an electrophotographic system for performing an image exposure by a laser beam, a method whereby the laser beam is irradiated to a rotary polygon mirror (hereinbelow, referred to as a polygon mirror) and is deflected thereby and a surface on a photosensitive material is exposed by the deflected reflection light is used. As a photosensitive material, it is desirable to use a photosensitive material having such a shape that it is located at an equal distance away from a light source of the laser beam, that is, it draws an arc from a reflecting surface of the polygon mirror. However, in order to form an image after the exposure, a cylindrical photosensitive material is used in many image forming apparatuses.

By using the cylindrical photosensitive material, lengths of optical paths from the respective light sources to the photosensitive material differ, so that a difference occurs in main scanning magnifications by the laser beam. As a method of correcting the difference in the main scanning magnifications, there is a method whereby an optical device such as an fθ lens or the like is provided between the light source and the photosensitive material. However, a high precision is required for the correction that is made by the optical device. In the many image forming apparatuses, therefore, the high-precision correction of the optical device is not performed but the main scanning length is divided into a plurality of areas and the magnification in the main scanning direction is adjusted by an insertion/extraction of small pixels (hereinbelow, referred to as "pixel segments") every division area.

A clock frequency showing the pixel segments is obtained by a method whereby a clock for transferring image data of one pixel is multiplied by a desired resolution. That is, assuming that the resolution is equal to 16, the clock frequency showing the pixel segments is equal to a frequency which is 16 times as high as the clock frequency for transferring one pixel. If the resolution is equal to 32, the clock frequency is equal to a frequency which is 32 times as high as the clock frequency for transferring one pixel.

The adjustment of the magnification in the main scanning direction is executed by using the foregoing multiplied high-frequency clock as a unit. Since the adjustment by the insertion/extraction of the pixel segments is the adjustment in the main scanning direction, if the adjustment is made to the image data of a line unit at the same position, the pixel positions which are subjected to the adjustment become continuous in the sub-scanning direction.

If the adjustment by the insertion/extraction of the pixel segments is performed to the same position in the main scanning direction, a texture appears at a period when the insertion or extraction is executed and it results in a deterioration in image quality. Therefore, there is an apparatus which makes such control that the insertion/extraction of the pixel segments is not performed at the same position in the main scanning direction by the line unit in which the adjustment is performed. According to Japanese Patent Application Laid-Open No. 2004-098592, by providing a random number control portion and a plurality of counting units, the above control is performed. Specifically speaking, timing for starting the operation of the counting unit serving as a base of calculation of an adjusting position is deviated every input of the line unit, thereby controlling so that the correction by the pixel segment insertion/extraction is not performed to the same position in the main scanning direction.

However, although Japanese Patent Application Laid-Open No. 2004-098592 discloses that the control is made so that the pixel-segment-insertion/extraction is not performed to the same position in the main scanning direction, uniform control is made irrespective of a type of image data to be processed. However, an effect which is obtained as a result of that the pixel segment insertion/extraction positions are not made continuous in the sub-scanning direction depends on the type of image data. For example, although the effect which is obtained since the pixel segment insertion/extraction positions are not continuous in the sub-scanning direction appears to a natural image such as a photograph or the like, in the case of a character or a diagram, the main scanning positions where the pixel segment insertion/extraction is executed become discontinuous in the sub-scanning direction, so that the image quality deteriorates.

SUMMARY OF THE INVENTION

In order to solve the above problems, the present invention provides an image forming apparatus comprising: a scanning unit configured to scan an image in a main scanning direction by a laser beam; a clock output unit configured to output a clock showing a period of one pixel; an image output unit configured to output one pixel of image data; a forming unit configured to form pixel segments divided by a preset number on a pixel unit basis from the pixel constructing the image data; a control unit configured to perform insertion/extraction control of a pixel segment so that exposure lengths in the main scanning direction by the scanning unit are equalized on a unit basis of the pixel segment formed by the forming unit; a dividing unit configured to divide an area of an image in the main scanning direction into division areas in accordance with a magnification for controlling the exposure lengths so as to be equalized; a setting unit configured to set a reference area for performing the insertion/extraction control in each of the division areas divided by the dividing unit; and a deciding unit configured to decide a position where the insertion/extraction control in each of the division areas by the dividing unit is performed, in accordance with attribute information of the image data in the reference area.

Further features of the present invention will become apparent from the following description of exemplary embodiments with reference to the attached drawings.

BRIEF DESCRIPTION OF THE DRAWINGS

FIG. 5 is a diagram illustrating an example of a construction of a print unit.

FIG. 6 a diagram illustrating an example of a construction of an area magnification of each print unit.

FIG. 7 is a diagram illustrating a correlation between a high-frequency clock and a pixel clock in a pixel clock generating unit.

FIGS. 8A and 8B are conceptual diagrams at the time of a pixel segment insertion and a pixel segment extraction.

FIGS. 9A, 9B, 9C, 9D, 9E, 9F and 9G are diagrams illustrating a harmful influence at the time of random number control.

FIGS. 10A and 10B are diagrams illustrating a harmful influence in a diagram.

FIGS. 11A, 11B and 11C are diagrams each illustrating a construction of attribute data in character image data.

FIG. 12 is a constructional diagram of a process line and a reference line in the first embodiment.

DESCRIPTION OF THE EMBODIMENTS

Best modes for embodying the invention will be described hereinbelow with reference to the drawings.

First Embodiment

Figure 1:
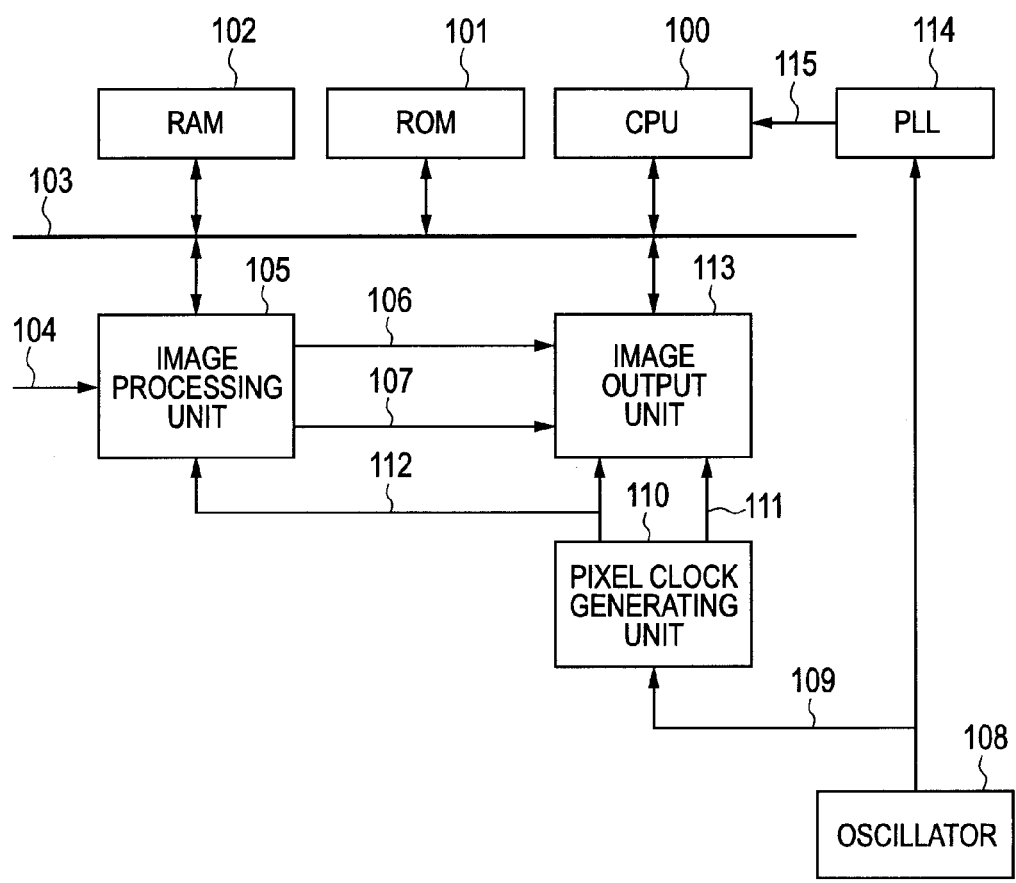
FIG. 1 is a constructional diagram of an image forming apparatus of the invention.

FIG. 1 is a diagram illustrating a construction of an image forming apparatus of the embodiment. In the diagram, a CPU (Central Processing Unit) 100 controls the whole image forming apparatus. An operating program of the CPU 100, a table which is referred to, and the like have been held in a ROM (Read Only Memory) 101. A RAM (Random Access Memory) 102 is a work memory of the CPU 100 or modules in the image forming apparatus, which will be described hereinafter. The operating program of the CPU 100 may be held in the RAM 102 instead of the ROM 101. A system bus 103 in the image forming apparatus of the invention is provided. Image data 104 is input to the image forming apparatus.

The image data 104 may be image data which is input from an image reading apparatus or the like (not shown), image data developed by an RIP (Raster Image Process) in the image forming apparatus, or the like. In the case where the image data 104 is, for example, luminance data of R, G, and B which is output by the image reading apparatus, an image processing unit 105 is constructed by a luminance/density converting unit, an N-value processing unit, and the like. A detailed internal construction of the image processing unit 105 will be described hereinafter.

Image data 106 obtained after a process by the image processing unit 105 and attribute information 107 corresponding to the image data 106 are illustrated. The image data 106 and the attribute information 107 are synchronously output from the image processing unit 105. An oscillator 108 generates a clock which is necessary to drive the image forming apparatus in the embodiment or an apparatus of a system such as a multi function apparatus including the image forming apparatus of the invention. A clock 109 is oscillated and generated by the oscillator 108.

A pixel clock generating (output) unit 110 outputs a high-frequency clock 111 which is supplied to an image output unit 113 in the image forming apparatus and a pixel clock 112 for handling the image data on a pixel unit basis. The image output unit 113 includes a print unit of the electrophotographic system and controls the image data 106 and the attribute information 107 which are output from the image processing unit 105 by using the pixel clock 112 and the high-frequency clock 111 which is output from the pixel clock generating unit 110.

A PLL (Phase Locked Loop) 114 multiplies the clock 109 which is output from the oscillator 108 to a driving frequency of the CPU 100. A clock 115 multiplied by the PLL 114 is an ordinarily high-frequency clock.

Figures 3, 4:
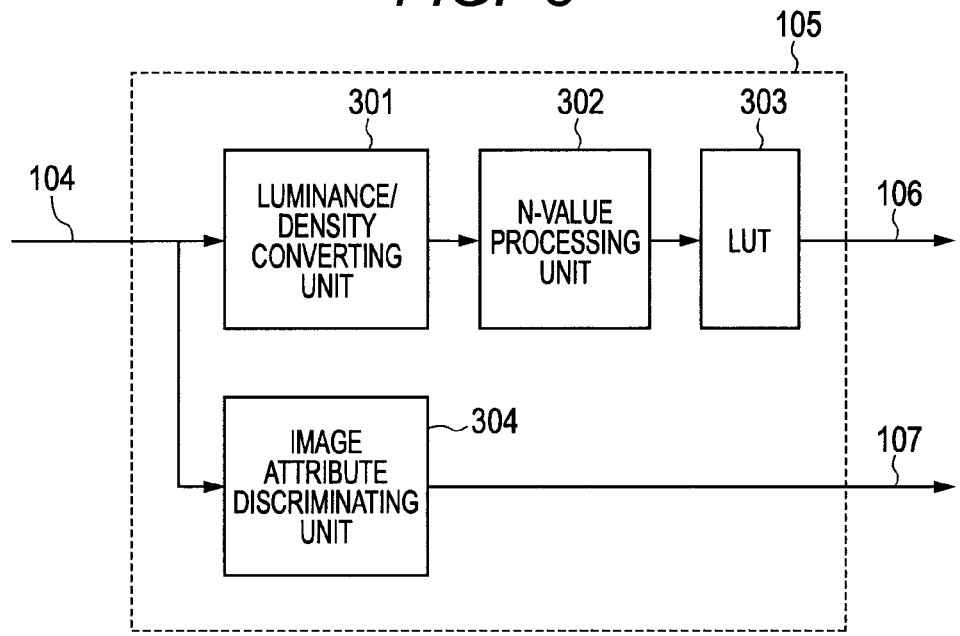
FIG. 3 is a constructional diagram of an image processing unit.
FIG. 4 is a diagram illustrating an example of a construction of an LUT.

Subsequently, an internal construction of the image processing unit 105 will be described. FIG. 3 is a diagram illustrating an example of a construction of the image processing unit 105. In FIG. 3, a luminance/density converting unit 301 converts image data R, G, and B of luminance which are input as image data 104 into density signals C, M, Y, and K to be printed and output.

An N-value processing unit 302 executes an N-value process to an output of the luminance/density converting unit 301. A value of N is decided in dependence on an interface of the print unit of the electrophotographic system. For example, if the interface of the print unit can receive 16-bit data, the N-value processing unit 302 converts the output of the luminance/density converting unit 301 into a signal of 4 bits (16 levels). An error diffusing process, a dither process, or the like may be used in the conversion.

An LUT (Look Up Table) 303 is used to convert the N-value data obtained by the N-value processing unit 302 into data of a format adapted to be output to the print unit. FIG. 4 illustrates an example of a table for converting 16-value data into data of a format adapted to be output to the print unit.

In FIG. 4, an input value corresponds to the output of the N-value processing unit and the diagram shows that the larger the number of "1" is, the higher the density is. Therefore, the minimum value of the density is equal to b'0000 and the maximum value of the density is equal to b'1111. The output value shows output data to the print unit at the post stage and indicates that the larger the number of "1" is, the higher the density is in a manner similar to the input value.

For example, when the input value is equal to b'1000, the LUT 303 converts it into a 16-bit output x'00FF (b'0000000011111111) as an output. Since the number of "1" is equal to 8, it indicates 8/16 as a density level of the pixel after the printing. The output value after the conversion is transferred at a frequency higher than a clock frequency at which the image data 104 is transferred.

In the case of the above example, in principle, a form in which the output value is output one bit by one by the high-frequency clock 111 which is 16 times as high as the clock by which the image data 104 is transferred is used. Transferring order conforms with a form which the user wants to express as a print unit. In the case of transferring the output value illustrated in FIG. 4 from a lower bit, the 16-bit output value x'00FF has a form in which after "1" was output 8 times, "0" is output 8 times. Therefore, an expression by the print unit has a form of a left-growth. On the contrary, in the case of transferring the output value from an upper bit, after "0" was output 8 times, "1" is output 8 times. Therefore, the expression by the print unit has a form of a right-growth. The table illustrated in FIG. 4 is an example and there is also a form of such a center-growth that the number of "1" increases from the center.

An image attribute discriminating unit 304 discriminates an attribute of the image data 104 which is input. The attribute which is discriminated by the image attribute discriminating unit 304 may be a type such as character, diagram, natural image, or the like of every pixel data or may be an attribute of every division area obtained by dividing the image data into a plurality of areas. As an attribute of every area, an attribute which is formed based on a numerical value or the like indicative of an average density amount or a level of a color variation in which the area is used as a unit. Or, it may be attribute information associated with a registration deviation of a correction of an inclination or curve of a scanning line due to a positional deviation of assembling to the image forming apparatus of a deflection scanning apparatus which depends on the construction of the print unit of the electrophotographic system. Further, it is also possible to construct in such a manner that a discrimination result based on combined conditions instead of the discrimination about a single factor of the attribute.

Further, the output form of the image of the output image data 106 in the case where the process which is executed by the N-value processing unit 302 is the error diffusion and that in the case where the process is the dither process differ largely. In the case of the error diffusion method, since it is sufficient that an average density has been held within a predetermined range, the process result for the input image data is not come down to a regular result. In the case of the N-value process, since the input image data is N-value processed on a predetermined window unit basis, an output result which is regular to a certain extent is obtained.

That is, it is also possible to reflect the process contents by the N-value processing unit 302 as well and to form/discriminate the attribute. For example, not only the discrimination result showing that the image data is the character is output as attribute information 107 but also attribute information which enables the process contents by the N-value processing unit 302 to be identified may be output. Further, the attribute information 107 may be constructed by a plurality of bits and a plurality of kinds of attribute information may be output to the post stage.

In the embodiment, since the pixel position control which executes the pixel-segment-insertion/extraction, which will be described hereinafter, is made in accordance with the attribute information 107 which is output by the image attribute discriminating unit 304, there are no limitations to the attribute information 107. That is, any information may be used so long as it is the attribute information of the pixel or area which is obtained from the input image data 104. Further, attribute information based on a mechanical or electrical intrinsic value of a motor or the like constructing the image forming apparatus may be included.

Subsequently, a construction of the image output unit 113 will be described. FIG. 5 is a diagram illustrating a construction of the print unit of the electrophotographic system. In FIG. 5, a laser beam irradiation port 501, a rotary polygon mirror (hereinbelow, referred to as a polygon mirror) 502, an fθ mirror 503, and a photosensitive material 504 are illustrated. A laser beam irradiated from the laser beam irradiation port 501 is reflected by the polygon mirror 502 and reaches the photosensitive material 504 through the fθ mirror 503.

Although the print unit is adjusted so that the laser beam which is reflected reaches the photosensitive material at an equal speed angle by the fθ mirror 503, an exposure length of the image data in the main scanning direction is not expressed by an equal length to the input data. In FIG. 5, if a length (shown by 505) in the main scanning direction in which printing can be performed is divided into four areas, a length (shown by 506) of the division area is ideally equal to ¼ of the length 505.

However, since the laser beam cannot be allowed to reach the photosensitive material 504 strictly at the equal speed by the fθ mirror 503, actually, the lengths of the four areas differ. In FIG. 5, lengths shown by 507 and 508 are shorter than the equal length shown by 506 and lengths shown by 509 and 510 are longer than the equal length 506.

If the image data which is exposed to the photosensitive material 504 becomes distorted data in the print output by the image output unit 113 if the lengths of the respective areas in the main scanning direction are not equal. Therefore, a micro zooming process is executed every area. Generally, control is made so as to equalize the lengths by executing the insertion or extraction of the pixel segments in accordance with a micro magnification of each area.

The micro magnification of each area differs depending on the print unit of the image forming apparatus. FIG. 6 illustrates an example of the micro magnification of each area according to three kinds of print unit constructions. For example, if a print unit 1 is constructed as a print unit of the image forming apparatus, the pixel segments are inserted into the image data which belongs to the area 507 in FIG. 5 so that the micro magnification is equal to +1.2% as a whole. If the construction of the print unit changes, the numerical value of the magnification changes. For example, if a print unit 3 is constructed as a print unit, even in the same area 507, control has to be made so that the micro magnification is equal to +1.05% as a whole. That is, the magnification in the 4-divided areas in the image forming apparatus 1 having the print unit and that in the image forming apparatus 2 having the print unit different from that of the image forming apparatus 1 differ.

The change in magnification is not limited only to the inserting direction of the pixel segment. For example, when referring to the area 509 in FIG. 5, in the print unit 2, it is necessary to extract the pixel segments so that the micro magnification is equal to −1.08%. In the print unit 3, it is necessary to extract the pixel segments so that the micro magnification is equal to −1.02%. Further, even in the same area, the magnification in the same direction is not always performed. For example, in the area 508 in FIG. 5, although the magnification is performed in such a direction as to insert the pixel segments (plus direction) in the print units 1 and 2. However, the magnification is performed in such a direction as to extract the pixel segments (minus direction) in the print unit 3. Further, in FIG. 5, although the case where the number of division in the main scanning direction is equal to 4 has been illustrated, the invention is not limited to such a case. That is, a case where the number of division differs also exists depending on the print unit.

The CPU 100 for controlling the whole image forming apparatus holds tables showing the magnification of each print unit of the form illustrated in FIG. 6 into the ROM 101 or RAM 102, thereby allowing a proper table to be referred to when the image forming apparatus is operated. By constructing in this manner, even if the construction of the print unit changes, the control of the pixel segment insertion/extraction amount can be changed merely by switching the table to be referred to. Even in the case where the magnification of each area changes by an operating mode (color image output operation, monochrome image output operation, low-speed operation, high-speed operation) of the image forming apparatus, it is possible to easily cope with such a case by the form in which the tables are held in the ROM 101 or RAM 102.

The pixel segment insertion/extraction control as an important element in the embodiment will now be described. FIG. 7 illustrates a relation between the high-frequency clock 111 and the pixel clock 112 which are output by the pixel clock generating unit 110. The clock 109 which is output by the oscillator 108 is input to the pixel clock generating unit 110. The pixel clock generating unit 110 outputs the high-frequency clock 111 by the PLL (not shown) provided therein. As for the multiplication correspondence by the PLL, it is desirable that there is a degree of freedom in the setting. For example, the setting of n/m times can be attained merely by multiplying the clock 109 by n times. It is better if a variety of values can be set as a set value of m or n.

The pixel clock 112 is formed by frequency-dividing the high-frequency clock 111. For example, if the resolution is equal to 16 as a unit of the pixel segment insertion/extraction control, the pixel clock 112 is formed by frequency-dividing the high-frequency clock 111 into 1/16. That is, the pixel clock 112 is formed in such a manner that one period of the pixel clock 112 is formed by 16 periods of the high-frequency clock 111 in FIG. 7. The formed pixel clock becomes a reference pixel clock in the case where the pixel segment insertion/extraction control is not executed. If one pixel segment is inserted, the pixel clock 112 becomes the clock in which the high-frequency clock 111 is extended by one period. That is, in the case of the resolution of 16, periods of the high-frequency clock 111 become one period. On the contrary, if one pixel segment is extracted, the pixel clock 112 becomes the clock in which the high-frequency clock 111 is shortened by one period. That is, in the case of the resolution of 16, 15 periods of the high-frequency clock 111 become one period.

The pixel segment insertion/extraction control will be described further in detail. The pixel segment insertion/extraction control is performed based on the period of the high-frequency clock 111. FIG. 8A illustrates the high-frequency clock 111, the pixel clock 112, and a form of the image data which is transferred at the time of the pixel segment insertion control. In the description, for simplicity of explanation, a case where an image in which a black pixel and a white pixel are alternately arranged on a pixel unit basis is processed will be described as an example. Further, it is assumed that all of 16 bits of the black pixel are equal to 1 and all of 16 bits of the white pixel are equal to 0.

In FIG. 8A, it is assumed that the period of the high-frequency clock 111 in which the insertion of the pixel segments is not executed is a pixel cycle A1. In the description, assuming that a pixel segment is to be inserted at the position of the pixel locating at the second leading edge of the pixel clock 112 (pixel segment insertion position), the pixel cycle locating at the second leading edge is extended by one period of the high-frequency clock 111 (pixel cycle A2). The pixel segment data which is transferred by the high-frequency clock 111 whose period is extended becomes the pixel data to be transferred in such a period, that is, the data which conforms with the data of the white pixel. That is, in FIG. 8A, the pixel segment data which is shown as a meshed region becomes the data of "0" showing the pixel segment of the white pixel.

Subsequently, the pixel segment extraction control will be described. FIG. 8B illustrates the high-frequency clock 111, the pixel clock 112, and a form of the image data which is transferred at the time of the pixel segment extraction control. It is assumed that the form of the image data which is transferred is the same as that described in FIG. 8A. In FIG. 8B, it is assumed that the period of the high-frequency clock 111 in which the pixel segment extraction is not executed is the pixel cycle A1. In the description, assuming that a pixel segment is to be extracted from the position of the pixel locating at the second leading edge of the pixel clock 112 (pixel segment extraction position), the pixel cycle locating at the position of the second leading edge is shortened by one period of the high-frequency clock 111 (pixel cycle A3). Therefore, in the image data which is transferred at the second leading edge, one white pixel segment is deleted.

Figure 2:
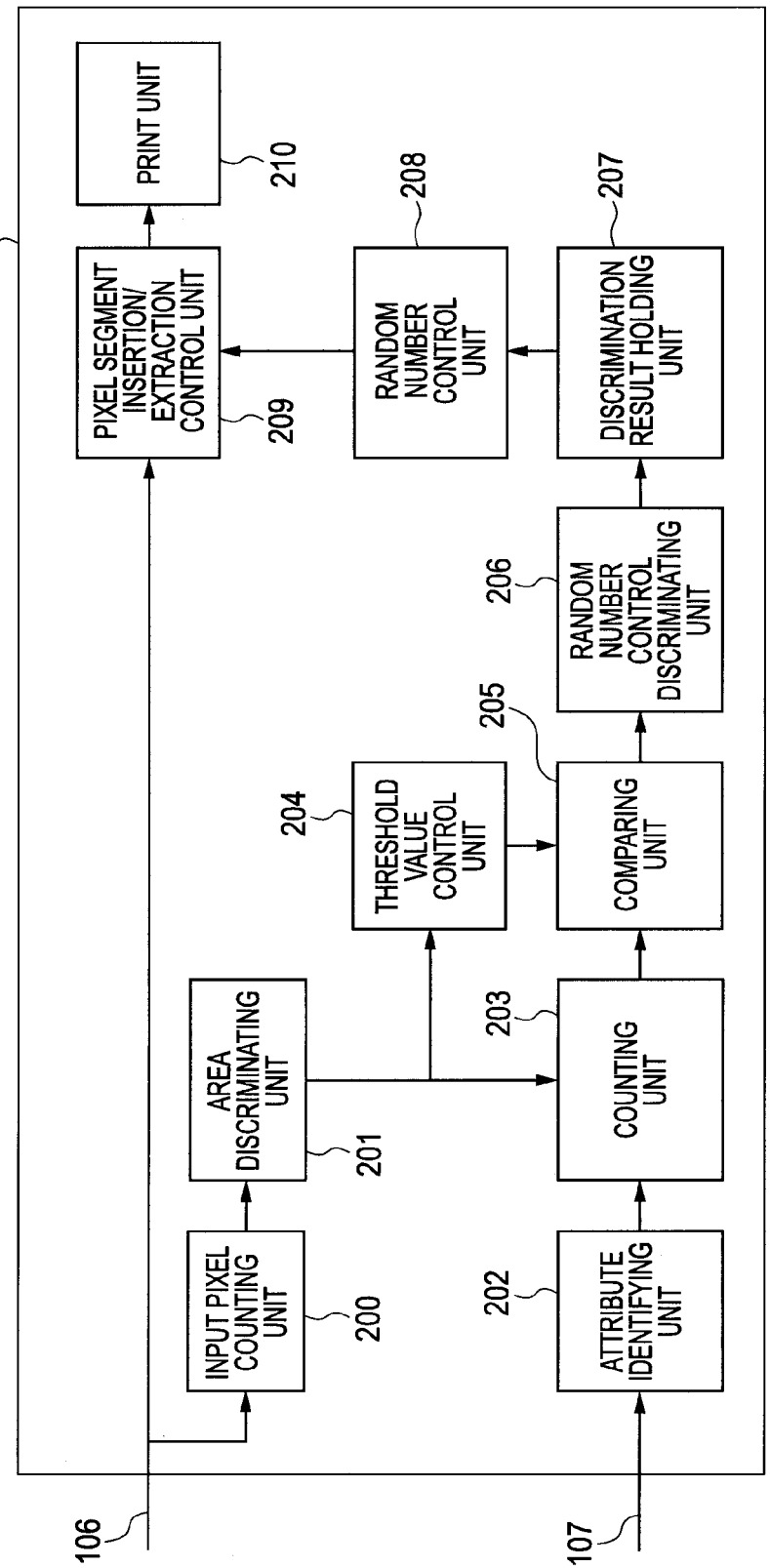
FIG. 2 is a constructional diagram of an image output unit.

Subsequently, the image output unit 113 which is most characteristic in the embodiment will be described. FIG. 2 is a diagram illustrating an internal construction of the image output unit 113. In FIG. 2, the same component elements as those in FIG. 1 are designated by the same reference numerals.

An input image counting unit 200 counts the number of pixel data which is output by the image processing unit 105. With reference to a count value of the input image counting unit 200, an area discriminating unit 201 discriminates the position in the main scanning direction to which the input image data belongs. An attribute identifying unit 202 receives the attribute information 107 which is output by the image processing unit 105 and identifies the attribute.

A counting unit 203 counts a result identified by the attribute identifying unit 202. A threshold value control unit 204 outputs a threshold value corresponding to an area determined by the area discriminating unit 201. A comparing unit 205 compares a count value counted by the counting unit 203 with the threshold value which is output by the threshold value control unit 204, and outputs significance information to a processing unit at the post stage when a comparing condition is satisfied. On the basis of an output result of the comparing unit 205, a random number control discriminating unit 206 discriminates whether or not pixel-segment-insertion/extraction pixels (pixels to which a pixel segment is to be inserted or from which a pixel segment is to be extracted) are set to be continuous or discontinuous in the sub-scanning direction for the relevant area of the image data which is input next (image data of the next line).

A discrimination result holding unit 207 holds a discrimination result by the random number control discriminating unit 206 in order to reflect to the image data which is input next (image data of the next line). Information which is held by the discrimination result holding unit 207 indicates whether or not the pixel-segment-insertion/extraction pixels are made continuous or discontinuous in the sub-scanning direction at the timing when the input image data has arrived at the position which belongs to the relevant area. Therefore, a data amount is very small and the minimum information amount is 1 bit (0: the pixels are continuous in the sub-scanning direction, 1: the pixels are discontinuous in the sub-scanning direction). In the embodiment, a holding form by the discrimination result holding unit 207 is not limited to that shown in the foregoing example. That is, in the case of such a form that the discrimination by the random number control discriminating unit 206 is performed on a pixel unit basis or a unit basis of a plurality of pixels, the data amount of the discrimination result is large. In such a case, however, such control that the data is compressed and held or the like may be performed.

At the timing when the input image data 106 corresponding to the information held in the discrimination result holding unit 207 has been input, a random number control unit 208 switches a mode to either the mode in which the pixel-segment-insertion/extraction pixels are set to be continuous in the sub-scanning direction or the mode in which they are set to be discontinuous. A pixel segment insertion/extraction control unit 209 controls the insertion or extraction of the pixel segments on the basis of the control by the random number control unit 208. A print unit 210 print-outputs the image data which is output by the pixel segment insertion/extraction control unit 209.

Specific examples about the control of the random number control unit 208 and the pixel segment insertion/extraction control unit 209 will now be described. The random number control in the random number control unit 208 is made on the basis of the magnification as a value held in the table of FIG. 6 and a count value of a counting unit (not shown) constructed in the apparatus while using the head pixel of the line as a reference. For example, a case where the user wants to use the mode in which the pixel-segment-insertion/extraction pixels are set to be discontinuous in the sub-scanning direction will be described. When the magnification as a value held in the table of FIG. 6 indicates a value adapted to insert one pixel segment into a period of five pixels, for example, a count value of the counting unit at a point of time when the head pixel of the first line is input is set to 0. If the counting unit executes counting in the quinary system, the count value changes like 0, 1, 2, 3, 4, 0, 1, 2, 3, 4, . . . each time the image data is input. If the pixel segment insertion positions are set to such a form that the insertion is executed when the count value of the counting unit is equal to 0, the first pixel, the sixth pixel, . . . become the pixel-segment-insertion pixels.

If the control is made by assuming that the pixel segment insertion positions are discontinuous in the sub-scanning direction, for example, it is sufficient to set an initial value of the counting unit to a value other than 0 before the head pixel data of the second line is input. That is, if 3 is set as an initial value, the count value of the counting unit changes like 3, 4, 0, 1, 2, 3, 4, 0, 1, 2, . . . . In a manner similar to the discrimination of the pixel segment insertion positions of the first line, now assuming that when the count value of the counting unit is equal to 0, the pixel segment insertion is executed, the third pixel, the eighth pixel, . . . become the pixel-segment-insertion pixels and the pixel segment insertion positions can be made discontinuous in the sub-scanning direction.

The random number control unit 208 controls the initial value of the counting unit by the random numbers. For example, in the above case, it controls so that any one of the values 0 to 4 is output.

In the embodiment, the random number generating method and the control for making the pixel segment insertion/extraction positions discontinuous in the sub-scanning direction are not limited to those mentioned in the above example. For instance, the random numbers may be generated by M series. Such a form that a weight is applied to a frequency of occurrence of each random number which is generated may be used. In the control for making the pixel segment insertion/extraction positions discontinuous in the sub-scanning direction, it is also possible to construct in such a manner that a value corresponding to the magnification setting of every area in FIG. 6 is accumulated and added and when an addition value exceeds a predetermined value, the pixel positions serving as pixel segment insertion/extraction positions are decided.

Subsequently, a harmful influence in the case where the pixel segment insertion/extraction positions are made continuous or discontinuous in the sub-scanning direction by using the foregoing random number control to the whole surface of the input image data 106 will be described.

FIGS. 9A to 9G are diagrams in the case where the pixel segment insertion/extraction positions are made continuous or discontinuous in the sub-scanning direction to the whole surface of the image data in which the black pixel and the white pixel are switched every pixel. It is assumed that the input image data 106 has a construction as illustrated in FIG. 9A and a case where the image data is converted into binary data (0: white pixel, 1: black pixel) by the N-value processing unit 302 will be described. It is assumed that an LUT conversion as illustrated in FIG. 9B is executed to the data obtained after the conversion by the N-value processing unit 302 and the resolution by the high-frequency clock 111 is equal to 16.

In the above prerequisite conditions, the input image data 106 is output as illustrated in FIG. 9C if it is not the pixel-segment-insertion/extraction pixel. In other words, after the data of 1 showing black continued for 16 periods of the high-frequency clock 111, the data of 0 showing white continues for 16 periods of the high-frequency clock 111. If the pixel positions serving as pixel segment insertion/extraction targets are made continuous in the sub-scanning direction, the pixel positions in the main scanning direction serving as pixel segment insertion/extraction targets become the same positions irrespective of the input image data 106. For example, assuming that the pixel segment insertion position is set to the head pixel, the data is formed as illustrated in FIG. 9D. If the pixel segment extraction position is set to the head pixel, the data is formed as illustrated in FIG. 9E.

In the case of such a setting that the pixel-segment-insertion/extraction pixels are made continuous in the sub-scanning direction as illustrated in FIGS. 9D and 9E, if the image data 106 is a character or a diagram, since no deviation occurs in the sub-scanning direction, it does not result in deterioration in picture quality. However, if the image data 106 is a natural image such as a photograph or the like, since the pixel segments are periodically inserted or extracted in the main scanning direction, an unnatural texture appears and it results in deterioration in picture quality.

Subsequently, a case where the pixel segment insertion/extraction positions are made discontinuous in the sub-scanning direction to the whole surface of the input image data 106 will be described. As a specific example, a case where the head pixels of the first line and the third line correspond to the pixel segment insertion positions and the second pixel of the second line corresponds to the pixel segment insertion position will be described.

In this case, the head black pixel of the first line has such a form that the construction of one pixel is extended by one period of the high-frequency clock 111 by the pixel segment insertion. Since the head pixel of the first line is the black pixel, the black pixel segment is inserted by the pixel segment insertion. Since the head pixel of the third line is also the black pixel, it has a form similar to that of the first line.

With respect to the second line, since the head pixel is a non-pixel-segment-insertion pixel, the data of the white pixel is formed by an amount corresponding to 16 periods of the high-frequency clock 111. Since the second pixel of the second line is a pixel-segment-insertion pixel, after the data of the white pixel was formed, the data of the black pixel is formed by 17 periods of the high-frequency clock 111.

Thus, the black pixel segments at the rear edge of the head pixel of the first line, the front edge of the second pixel of the second line, and the rear edge of the head pixel of the third line are formed so as to overlap. If the same control is performed to the second line, third line, and fourth line as targets, the white pixel segments at the rear edge of the head pixel of the first line, the front edge of the second pixel of the second line, and the rear edge of the head pixel of the third line are formed so as to overlap.

Although the case about the pixel segment insertion has been described above, a similar effect is obtained even in the case where the pixel segment extraction control is made. That is, in the case where the pixel-segment-insertion/extraction pixels are made discontinuous in the sub-scanning direction, the unnatural texture is prevented to the natural image such as a photograph or the like. However, in the case of a character or a diagram, edges which are discontinuous in the sub-scanning direction are formed.

For example, if such control that the pixel segment insertion/extraction positions are made discontinuous in the sub-scanning direction is performed to a diagram as illustrated in FIG. 10A, the diagram becomes as illustrated in FIG. 10B. As for the micro magnification conversion in the main scanning direction, the same number of pixel segments are inserted/ extracted in each line and each area by the pixel segment insertion/extraction control. However, the image in which a deviation occurs in the main scanning direction on a unit basis of one pixel (one line) in the sub-scanning direction in accordance with the random number control and the resolution is formed.

The embodiment intends to solve the foregoing problem by the construction illustrated in FIG. 2 and will be described in detail hereinbelow with reference to other drawings.

FIG. 11A is a diagram illustrating a construction of the image data 106. As illustrated in the diagram, the image data 106 in the description is constructed by characters. The image attribute discriminating unit 304 constructed in the image processing unit 105 discriminates the attribute to the input image data of FIG. 11A. In the description, for simplicity of explanation, it is assumed that the attribute which is discriminated by the image attribute discriminating unit 304 is a character attribute.

The image data whose attribute has been determined by the image attribute discriminating unit 304 becomes image data as illustrated in FIG. 11B. In FIG. 11B, a portion shown in white is a pixel group determined as a character and a portion shown in black is a pixel group determined as a non-character. When referring to the discriminated image in two areas as illustrated in FIG. 11C, with respect to an area A, a large amount of portions shown in white is included therein, and with respect to an area B, the whole portion is shown in black.

In the embodiment, the above discrimination result is used for the control of the pixel segment insertion/extraction positions.

If an amount of portions shown in white is large, it is determined that the image data to be processed is image data of the characters. Control is made in such a manner that the pixel segment insertion/extraction positions to the image data 106 of the next line are fixed in the main scanning direction. That is, control is made so that the pixel segment insertion/extraction positions are continuous in the sub-scanning direction. On the contrary, if an amount of portions shown in black is large, it is determined that the image data to be processed is image data of the non-characters. Control is made in such a manner that the pixel segment insertion/extraction positions to the image data 106 of the next line are decided based on the random number control. That is, control is made so that the pixel segment insertion/extraction positions are discontinuous in the sub-scanning direction.

By deciding the attribute serving as a target of the discrimination and counting the decided attributes as mentioned above, the attribute of the pixel data constructing the previous line can be known. By deciding the pixel segment insertion/extraction positions based on the method adapted to the attribute, such a harmful influence as illustrated in FIG. 10B can be eliminated.

The method of referring to the previous line will be described further in detail with reference to other drawings. FIG. 12 is a constructional diagram in the case where the previous line of the image data 106 to be processed is controlled as a reference line (reference area). The image data constructing the main scanning direction is divided into areas in accordance with the magnification. In FIG. 12, the image data in the main scanning direction is divided into three areas, the magnification of the first area is set to P, the magnification of the second area is set to Q, and the magnification of the third area is set to R, respectively. In the image forming apparatus to which the embodiment is applied, the number of pixel segments which are inserted into each area or the number of pixel segments which are extracted from each area is determined in accordance with the value of the magnification of each area.

Figure 15:
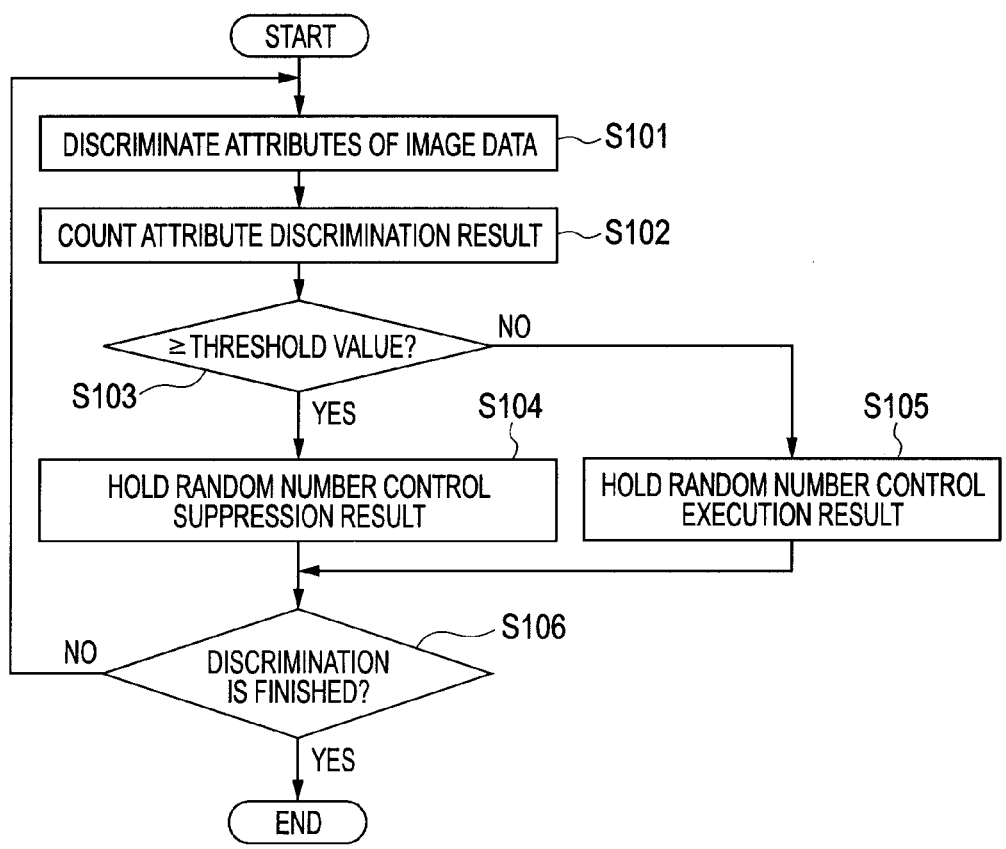
FIG. 15 is a flowchart illustrating an operation flow of a random number control unit.
Figure 16:
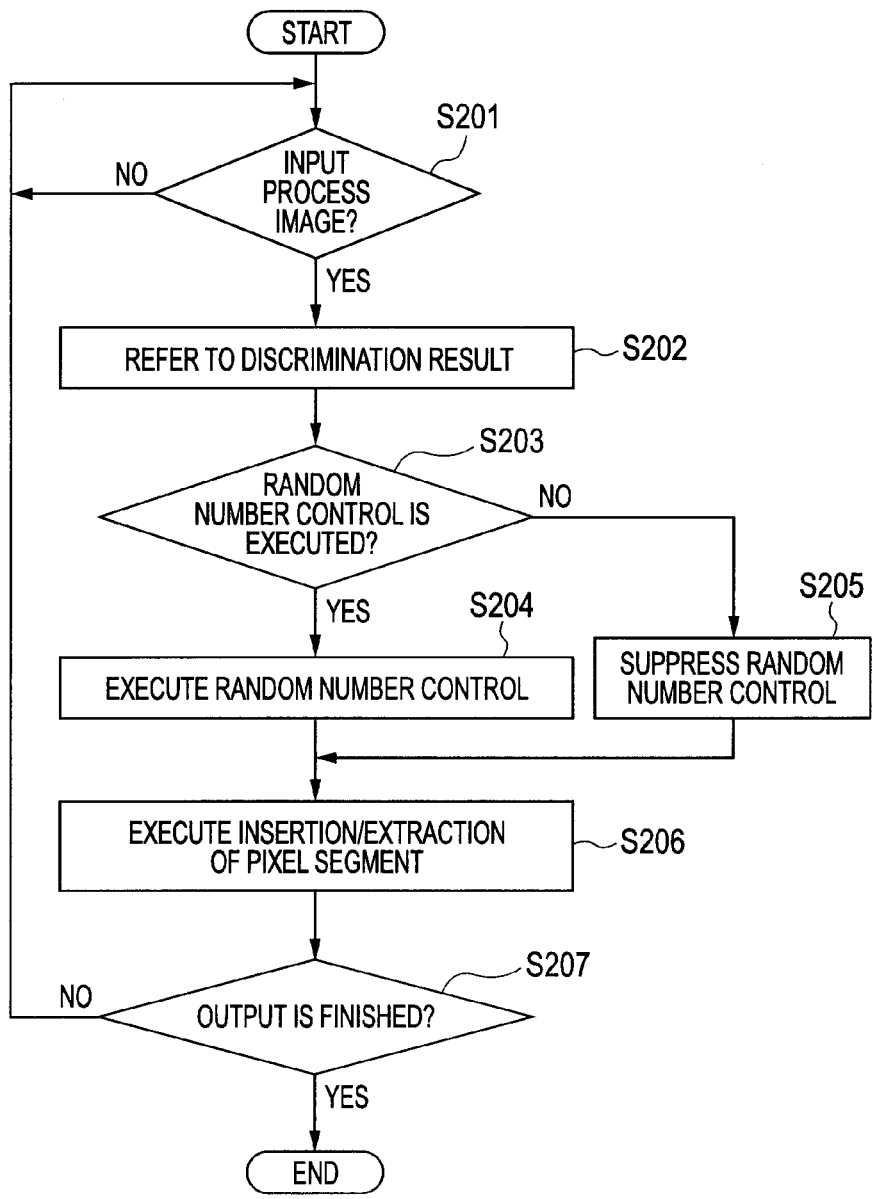
FIG. 16 is a flowchart illustrating an operation flow of a pixel segment insertion/extraction control unit.

A description will be made hereinbelow also with reference to control flows illustrated in FIGS. 15 and 16. FIG. 15 is the control flow regarding the execution of the random number control in the image output unit 113. FIG. 16 is the control flow for the pixel segment insertion/extraction control unit 209.

The image attribute discriminating unit 304 receives the image data 104 which is input and discriminates the attribute (step S101). For example, in the case of discriminating the character attribute on a pixel unit basis to the image of FIG. 11A, the image attribute discriminating unit 304 outputs the attribute information 107 showing the character attribute. The attribute identifying unit 202 receives the attribute information 107 and identifies the attribute. In the description, since the information which is output as attribute information 107 is only the character attribute, it is detected that the attribute information 107 which is input is the character attribute and a detection signal is output to the post stage. If the attribute information 107 is constructed by a plurality of bits, in the attribute identifying unit 202, the attribute which the user wants to detect is identified and an identification result is output to the post stage. For example, if two kinds of attributes such as character attribute and achromatic attribute are included as attribute information 107, if the user wants to detect the black character by the attribute identifying unit 202, the identification is performed by the OR of the respective attributes of the attribute information 107.

The counting unit 203 counts an identification signal which is output by the attribute identifying unit 202 (step S102). It is now assumed that the count control by the counting unit 203 is performed on an area unit basis controlled by the input image counting unit 200 and the area discriminating unit 201. In other words, the count value of the counting unit 203 is initialized at timing when the magnifications (P, Q, R) illustrated in FIG. 12 are switched.

At the timing when the magnifications are switched, the comparing unit 205 compares the count value of the counting unit 203 with the threshold value of each division area which is controlled by the threshold value control unit 204 (step S103). In step S103, when the count value of the counting unit 203 is equal to or larger than the threshold value, the random number control discriminating unit 206 outputs a result for suppressing the random number control of the pixel segment insertion/extraction to the relevant area of the next line. For example, if the pixels of the character attribute of the threshold value or more exist in the first area (magnification P), the random number control discriminating unit 206 outputs so as to make such control that the pixel segment insertion/extraction positions in the first area of the next line are made continuous in the sub-scanning direction. The discrimination result holding unit 207 holds the output result of the random number control discriminating unit 206 for the processes of the next line (step S104).

If the count value of the counting unit 203 is smaller than the threshold value in step S103, the random number control discriminating unit 206 outputs a result for executing the random number control of the pixel-segment-insertion/extraction to the relevant area of the next line. That is, if only the pixels of the character attribute less than the threshold value exist in the relevant area, the random number control discriminating unit 206 outputs so as to make such control that the pixel segment insertion/extraction positions of the relevant area of the next line are made discontinuous in the sub-scanning direction. The discrimination result holding unit 207 holds the output result of the random number control discriminating unit 206 for the processes of the next line (step S105).

If the control method of the pixel-segment-insertion/extraction positions of the next line of each of all division areas is decided, when the image data of the next line is input, the pixel segment insertion/extraction positions are determined in accordance with the relevant area. Before the image data 106 which is processed is input, the random number control unit 208 outputs the random number control method of the processing area. When the input of the image data 106 which is processed is started (step S201), the pixel segment insertion/extraction control unit 209 refers to the discrimination result of the random number control method which is output by the random number control unit 208 (step S202). If the discrimination result indicates that there are many character attributes in the relevant area of the previous line (NO in step S203), the pixel segment insertion/extraction control unit 209 controls so that the pixel segment insertion/extraction positions are continuous in the sub-scanning direction (step S205). If the discrimination result indicates that the number of character attributes existing in the relevant area of the previous line is small (YES in step S203), the pixel segment insertion/extraction control unit 209 controls so that the pixel segment insertion/extraction positions are discontinuous in the sub-scanning direction (step S204). The pixel segment insertion/extraction control unit 209 executes the pixel segment insertion/extraction control in accordance with the decided pixel segment insertion/extraction positions (step S206).

Until the output of all data of the image data 106 is finished, the pixel segment insertion/extraction control unit 209 repeats the processes in steps S201 to S206 (step S207). As mentioned above, by changing the control of the pixel segment insertion/extraction positions of the line data serving as a processing target on the basis of the count value of the attribute information 107 of the previous line serving as a reference target on a unit basis of the area divided in the main scanning direction, the pixel segment insertion/extraction control adapted to the input image can be performed.

That is, to the image data such as character, diagram, or the like, the random number control for performing the pixel segment insertion/extraction position control is suppressed and, to the image data such as a natural image like a photograph or the like, the random number control for performing the pixel segment insertion/extraction position control is executed. Therefore, the pixel segment insertion/extraction can be performed to the pixel positions in the main scanning direction adapted to the input image data, and the quality of the output image can be improved.

Although the above description has been made on the assumption that the image data of one precedent line of the line which is processed and the attribute information exist as a reference line, for example, there is a case where the reference line does not exist like the input first line. In such a case, it is sufficient to execute the processes with respect to the attribute information according to the image data out of the input image data as a prerequisite. For example, if the image data before the first line is input is a blank portion (image data in an unprintable area) upon outputting, the control is made on the assumption that the character attribute does not exist as attribute information by assuming that it is the white image data as a prerequisite.

Second Embodiment

The first embodiment has been described on the assumption that each area obtained by dividing the main scanning direction is used as a unit and the presence or absence of the random number control of the pixel segment insertion/extraction positions of the line which is processed is controlled by the count value of the attribute information of each pixel of the reference line (previous line).

Figure 13:
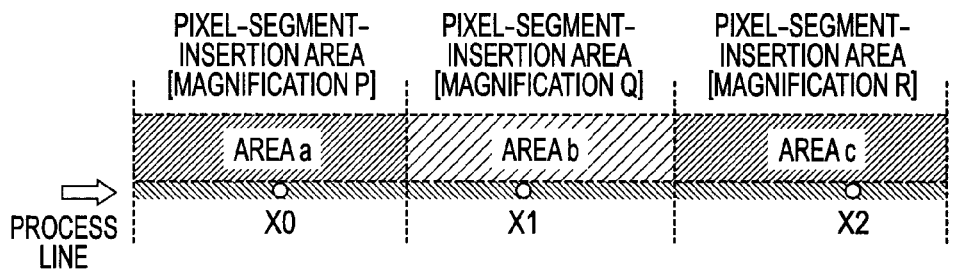
FIG. 13 is a constructional diagram of a process line and reference areas in the second embodiment.

However, the invention is not limited to the form of the first embodiment. A form of the reference attribute information in the second embodiment of the invention is illustrated in FIG. 13. In the second embodiment, control is made with reference to the attribute information in the area (reference area) before the process line.

The division areas in the main scanning direction are set to the same three areas as those in the first embodiment and the magnifications of those areas are set to P, Q, and R. In the image data of the process line, it is assumed that the pixel data belonging to the first area is set to X0, the pixel data belonging to the second area is set to X1, and the pixel data belonging to the third area is set to X2, respectively.

At this time, to the random number control of the pixel segment insertion/extraction positions to the pixel data (X0) belonging to the first area, attribute information of the area having a width of a plurality of lines in the sub-scanning direction instead of the previous line of the same area is referred to. That is, it is assumed that the random number control of the pixel segment insertion/extraction positions to the pixel data belonging to the first area is determined in accordance with the attribute information of a meshed area (a).

With respect to the reference to the attribute information regarding the area (a), in a manner similar to the first embodiment, the attribute information of each pixel associated with the pixel data in the area (a) may be counted or may be controlled on the basis of average density information in which the area (a) is used as a unit or on the basis of a numerical value showing a color variation. Further, it is also possible to construct in such a manner that control is made so that the image attribute discriminating unit 304 forms the attribute information in which the pixel data is used as a unit, the attribute information of the whole area (a), and the like and in the attribute identifying unit 202, control is made on the basis of the OR of the identification targets.

In this manner, the presence or absence of execution of the random number control of the pixel segment insertion/extraction positions of the process line is determined with reference to the attribute information of the area (area a, area b, area c) having a width in the sub-scanning direction before the area obtained by dividing the main scanning direction. By such control, the random number control of the pixel segment insertion/extraction positions of the process line can be performed on the basis of the different attribute information of a wide range.

Third Embodiment

The foregoing second embodiment has such a form that each area obtained by dividing the main scanning direction is used as a unit and to the decision of the random number control of the pixel-segment-insertion/extraction pixels of the process line, the attribute information of the area having the width in the sub-scanning direction before the area obtained by dividing the main scanning direction is referred to.

However, the second embodiment has such a form that although the attribute information of the area having the width in the sub-scanning direction before the process line can be referred to, the attribute of the image data locating around an area boundary portion in the main scanning direction where the magnification change occurs is not reflected.

Therefore, in the third embodiment of the invention, the random number control of the pixel-segment-insertion/extraction pixels of the process line is determined with reference to the attribute information of each pixel data belonging to the magnification switching area and the attribute information of the area having the width in the sub-scanning direction.

Figure 14:
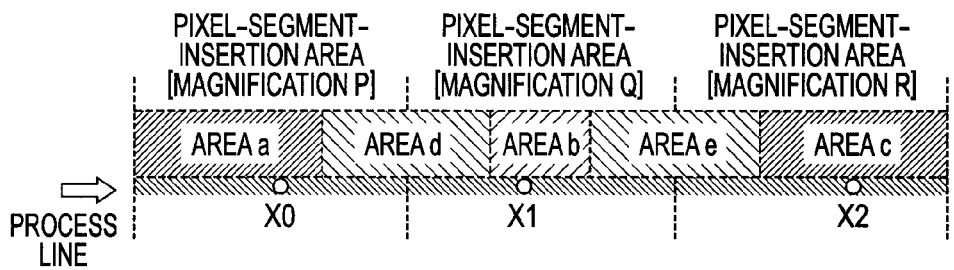
FIG. 14 is a constructional diagram of a process line and reference areas in the third embodiment.

A constructional diagram in the third embodiment is illustrated in FIG. 14. In the diagram, since the area a, area b, and area c are the same as those in FIG. 13, their description is omitted here. It is a characteristic portion of the third embodiment that an area d including an area where the magnification is switched from P to Q and an area e including an area where the magnification is switched from Q to R are constructed.

For example, the decision of the random number control of the pixel-segment-insertion/extraction pixels to the division area in the main scanning direction to which a pixel X1 in the process line belongs will be described. In the third embodiment, attribute information of the area b and attribute information of the area d are referred to in the decision of the random number control of the pixel-segment-insertion/extraction pixels to the division area in the main scanning direction to which a pixel X1 in the process line belongs. At this time, an attribute information target of the area b and an attribute information target of the area d may be identical or attribute information which is not reflected to the area b may be included in the area d. Specifically speaking, the area b may be constructed by character attribute information and average density information and in the area d, achromatic attribute information may be added to the attribute information.

Further, the character attribute information included in the area b and weights of count values of the character attribute information included in the area d and the character attribute information included in the area d may be changed. Control may be made so as to reflect a ratio or difference between the magnifications P and Q to the weights.

As mentioned above, in the third embodiment, since the attribute information of the boundary portion where the magnification changes is included and the random number control of the pixel-segment-insertion/extraction positions divided in the main scanning direction is determined, such control that the attribute information is precisely reflected can be made.

According to the foregoing embodiments 1 to 3, the following effects are obtained.

In the micro magnification control in the main scanning direction by the insertion or extraction of the pixel segments, the proper process can be executed in accordance with the attribute of the reference area. Particularly, by setting the reference area to the area of the previous line belonging to the division area, the micro magnification control corresponding to the attribute constructing the pixel just before can be realized. If the reference area is set to the area having the width in the sub-scanning direction belonging to the division area, the micro magnification control which corresponds to the attribute in a wide range and cannot be reflected in the attribute of the pixel unit can be realized. On the other hand, the micro magnification control corresponding to the attribute of the area at a boundary between the areas of the different magnifications can be realized. Further, the micro magnification control to obtain the most proper output image from the count value or ratio of the attribute of the reference area or a combination of them can be realized.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-274434, filed Dec. 9, 2010, which is hereby incorporated by reference herein in its entirety.

What is claimed is:

1. An image forming apparatus comprising:
a scanning unit configured to scan an image in a main scanning direction by a laser beam;
a clock output unit configured to output a clock showing a period of one pixel;
an image output unit configured to output one pixel of image data;
a forming unit configured to form pixel segments on a pixel unit basis by dividing by a preset number, the pixel constructing the image data;
a control unit configured to perform insertion/extraction control of a pixel segment so that exposure lengths in the main scanning direction by the scanning unit are equalized on a pixel segment unit basis;
a dividing unit configured to divide an area of an image in the main scanning direction into divided areas in accordance with a magnification such that exposure lengths are controlled so as to be equalized;
a setting unit configured to set a reference area for performing the insertion/extraction control in each of the divided areas; and
a deciding unit configured to decide a position where the insertion/extraction control in each of the divided areas is performed, in accordance with attribute information of the image data in the reference area.

2. The apparatus according to claim 1, wherein the reference area set by the setting unit is an area of one precedent line belonging to each of the divided areas.

3. The apparatus according to claim 1, wherein the reference area set by the setting unit is an area having a width of a plurality of lines in a sub-scanning direction belonging to each of the divided areas.

4. The apparatus according to claim 1, wherein the reference area set by the setting unit is an area having a width of a plurality of lines in a sub-scanning direction belonging to each of the divided areas and an area having a width of a plurality of lines in the sub-scanning direction in a boundary portion between the divided areas.

5. The apparatus according to claim 1, wherein the decision by the deciding unit is based on a count value or ratio of the attribute information of the pixel unit belonging to the setting unit or the attribute information of an area unit belonging to the setting unit.

6. The apparatus according to claim 1, wherein the deciding unit is further configured to decide whether the pixel segments which are inserted/extracted in the main scanning direction are made continuous or discontinuous in a sub-scanning direction.

7. The apparatus according to claim 6, wherein if the deciding unit decides that pixel segments are made discontinuous in the sub-scanning direction, the control unit uses random number control.

8. An image forming method carried out in an image forming apparatus, wherein the apparatus comprises:
- a scanning unit configured to scan an image in a main scanning direction by a laser beam;
- a clock output unit configured to output a clock showing a period of one pixel;
- an image output unit configured to output one pixel of image data;
- a forming unit configured to form pixel segments on a pixel unit basis by dividing by a preset number, the pixel constructing the image data; and
- a control unit configured to perform insertion/extraction control of a pixel segment so that exposure lengths in the main scanning direction by the scanning unit are equalized on a pixel segment unit basis, the method comprising:
- dividing an area of an image in the main scanning direction into divided areas in accordance with a magnification such that exposure lengths are controlled so as to be equalized;
- setting a reference area for performing the insertion/extraction control in each of the divided areas; and
- deciding a position where the insertion/extraction control in each of the divided areas is performed, in accordance with attribute information of the image data in the reference area.

9. A non-transitory computer-readable storage medium storing a computer program that causes a computer to execute the image forming method according to claim 8.

10. An image forming apparatus comprising:
- a dividing unit configured to divide an image into a plurality of divided areas in a main scanning direction;
- a setting unit configured to set a reference area for performing pixel segment insertion/extraction control in each of the plurality of divided areas; and
- a unit configured to decide a position where the pixel segment insertion/extraction control in each of the plurality of divided areas is performed, in accordance with attribute information of image data of the reference area set by the setting unit.

* * * * *